Dec. 28, 1965   T. C. RANDELL ET AL   3,225,460
AMUSEMENT AND EDUCATIONAL DEVICE
Filed June 6, 1962   2 Sheets-Sheet 1
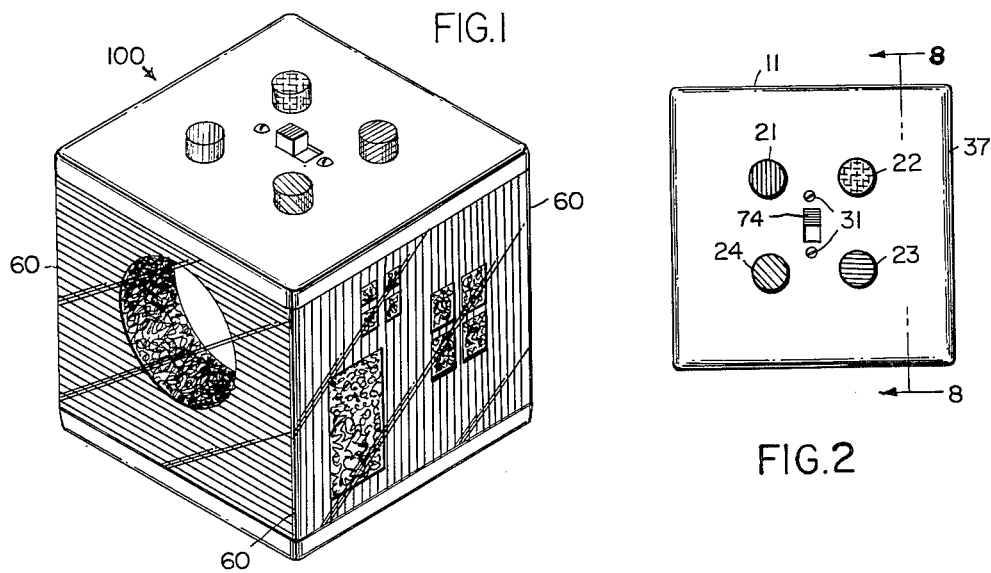
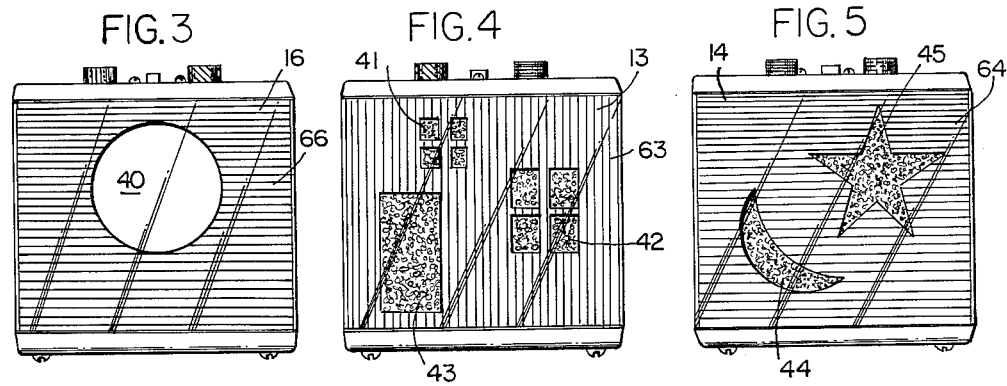
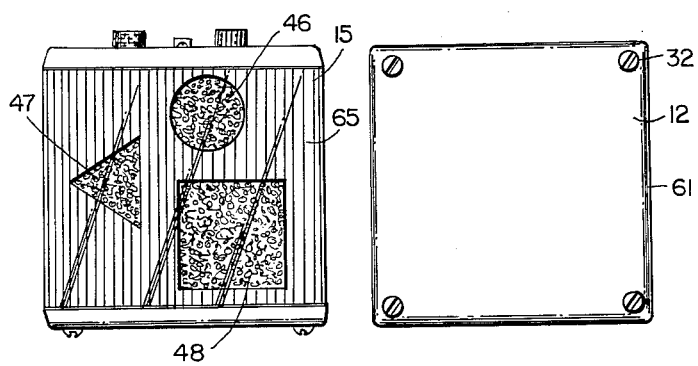
INVENTOR.
THEODORE C. RANDELL
THOMAS S. ELDRIDGE
BY
Ezekiel Wolf, Wolf & Greenfield
ATTORNEYS Dec. 28, 1965    T. C. RANDELL ET AL    3,225,460
AMUSEMENT AND EDUCATIONAL DEVICE
Filed June 6, 1962    2 Sheets-Sheet 2

INVENTOR.
THEODORE C. RANDELL
THOMAS S. ELDRIDGE

*Ezekiel Wolf, Wolf & Greenfield*
ATTORNEYS

United States Patent Office 3,225,460
Patented Dec. 28, 1965

3,225,460
AMUSEMENT AND EDUCATIONAL DEVICE
Theodore C. Randell, 1 Wendell St., Cambridge, Mass., and Thomas S. Eldridge, Brooklyn, N.Y. (Rensselaerville, Albany County, N.Y.)
Filed June 6, 1962, Ser. No. 200,545
5 Claims. (Cl. 35—22)

The present invention relates in general to amusement and education and more particularly concerns a novel device for amusing small children while at the same time educating them in the exercise of logic. Despite its simplicity and low cost, the invention absorbs the interest of a small child for exceptionally long periods of time. In addition, the device is rugged and safe.

While there are many toys and other devices available for small children, most toys and devices hold the attention of a child for only a relatively short time duration. Accordingly, it is an important object of the invention to provide a device for holding the attention of a small child for relatively long periods of time.

It is another object of the invention to provide a device in accordance with the preceding object which also educates the child in the exercise of logic.

Still another object of the invention is to achieve the preceding object with a relatively low-cost rugged structure safe for handling by children.

According to the invention, a housing is fitted with a number of stimuli selecting means. A number of stimuli carried by the housing provide an observable response when the stimuli selecting means are appropriately actuated. Means are provided for intercoupling the stimuli actuating means and the stimuli so that actuating each of the stimuli selecting means produces an observable response, but at least some observable responses require actuating more than one of the stimuli selecting means while eliminating the observable response occuring when pressing one of such plurality of selecting means alone.

In a more specific form of the invention, the stimuli selecting means are electrical switches, such as pushbutton switches and the stimuli are electrically operated, such as lights and buzzers. An electrical power source and means intercoupling the switches, lights and/or sounders reside within the housing.

Figure 8:
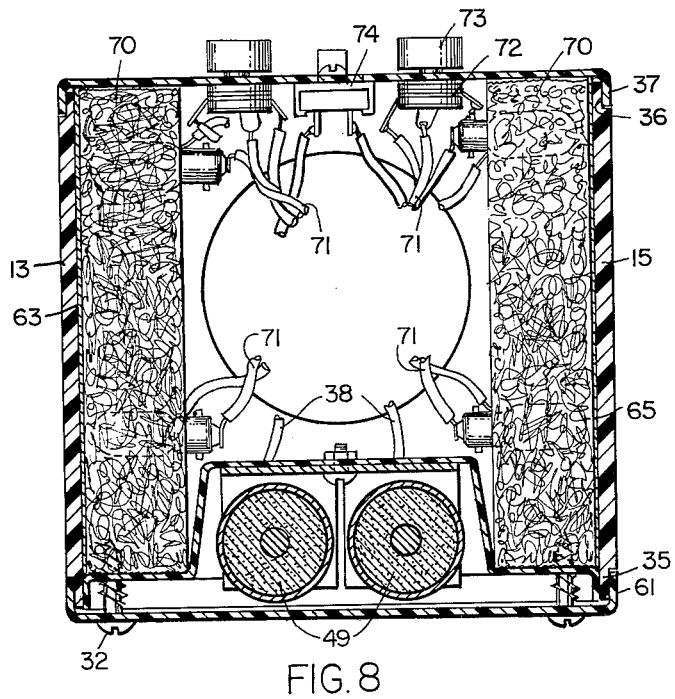
Figure 9:
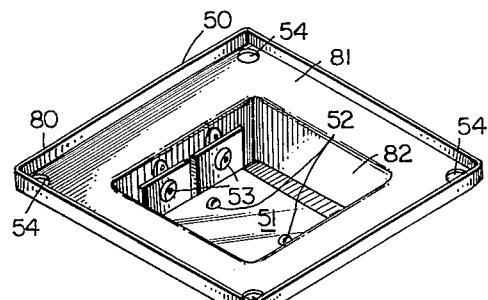
Figure 10:
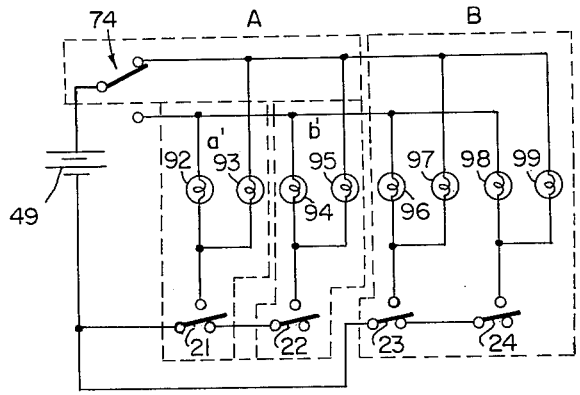

Other features, objects and advantages of the invention will become apparent from the following specification when read in connection with the accompanying drawings in which:

FIG. 1 is a perspective view of a preferred embodiment of this invention;
FIG. 2 is a top plan view thereof;
FIG. 3 is a view of a first side thereof;
FIG. 4 is a view of a second side thereof;
FIG. 5 is a view of a third side thereof;
FIG. 6 is a view of a fourth side thereof;
FIG. 7 is a bottom view thereof;
FIG. 8 is a cross sectional view taken through line 8—8 of FIG. 2;
FIG. 9 is a perspective view of an element thereof; and
FIG. 10 is a diagrammatic view of a preferred circuit arrangement of the device of this invention.

With reference now to the drawings and more particularly FIG. 1 thereof, a representative embodiment of the device of this invention is indicated generally at 100. The invention comprises a four-inch cube having a removable cover plate 11 and a removable base plate 12. In other embodiments the device may provide a housing having other basic solid geometric forms such as pyramids, spheres, rectangles, etc. Irregular shaped outer configurations may also be employed. Side walls 13, 14, 15 and 16 are provided composed of a clear plastic material such as cellulose acetate-butyrate. The walls are joined to each other at rounded corner portions 60. In the preferred embodiment the walls are integral with each other and are formed from a tubular plastic member having a square cross section. However, it is also possible to use separate plastic walls and form joints therebetween as by gluing, bolting or fusing at corner portion 60. Each of the walls 13, 14, 15 and 16 have rabbeted lower edges 35 and rabbeted upper edges 36. The rabbeted edges 35 and 36 are adapted to receive downturned lip portions of the cover and base plates 37 and 61 respectively.

Square, opaque, colored paper liners 63, 64, 65 and 66 are provided within the housing directly backing side walls 13, 14, 15 and 16, respectively. The liners 63 and 65 are red, while liners 64 and 66 are blue. Since the side walls are transparent these colors can be seen from outside of the housing. Each of the liners has cut out portions having varying configurations such as circle 40, window 41, window 42, rectangle 43, star 45, moon 44, circle 46, triangle 47 and square 48. It will be obvious that various configurations can be cut out of the colored opaque paper liners. Similarly varying colored liners can be employed to provide an assortment of color combinations if desired. In some embodiments it may be desirable to provide opaque portions directly on the side walls as by opaque painting of selected portions of the side wall. In other embodiments the liners are not opaque but have different light transmission properties than the side walls.

Support panels 70 which may be transparent or translucent are located directly behind the opaque liners. In the preferred embodiment, the support panels 70 comprise four translucent polystyrene foam blocks. The support panels may be glued, bolted or positioned in place by any conventional means. The support panel adjacent liner 66 has a cut out portion therein corresponding to the circle of the cut out portion 40 of the liner 66. This cut out portion provides visual access to the hollow portion of the housing.

Eight electric flashlight bulbs capable of being ignited thereby producing visual stimuli, are provided each mounted in a support panel 70 adjacent a cut out portion of the linings 63, 64 and 65. The flashlight bulbs may be easily mounted in the support panels by localized heating of the polystyrene support panels and impression of the bulbs in the panels. In modified forms of the invention the bulbs may be mounted by other conventional means and in some cases the support panel 70 may be entirely eliminated. In the preferred embodiment, the support panel 70 provides an advantageous bulb supporting and light diffusing function.

Four conventional push button electrical switches 21, 22, 23 and 24 are mounted on the cover plate 11 having body portions 72 extending within the housing and push buttons 73 extending out of the housing and accessible from the outside of the housing to control actuation of the electric light bulbs. An electrical slide switch 74 is suitably mounted on the cover plate 11 by means of mounting screws 31. The electrical switches 21, 22, 23, 24 and 74 provide a means for actuating the stimuli.

A pair of conventional flashlight batteries 49 are located above the base plate 12 and provide a means for energizing the electric bulbs upon control of the switches. As best seen in FIGS. 8 and 9, the batteries 49 are mounted on an insulating insert plate 51 having terminal connection points 53 located axially of the batteries at either of the ends thereof. The insert plate 51 preferably has a C-shape and resilient properties which enable it to act as a spring clip and resiliently support the batteries. The insert plate 51 is attached by means of attachment screws 52 to an insulating holder 50. The insulating holder 50 comprises a recessed area 82 having an outwardly extending flange 81 providing holes 54 at corners thereof and a downwardly turned rim 80 surrounding the flange 81. The insulating holder 50 is mounted in the device as shown in FIG. 8 by means of self-threading screws 32 attached to support panels 70. Screws 32 provide a means for attaching both the base plate 12 and the holder 50 to the device. Alternatively, other attachment means such as gluing, fusing or stapling may be employed.

In certain embodiments of the present invention it is possible to provide an electrical socket in place of the batteries 49 and holder plate 50. In such cases the electrical socket may be attached to a wall socket and an outside source of electrical energy may be provided to the device.

Electrical wiring 71 is provided within the housing to electrically connect the various components in the circuit arrangement shown in FIG. 10. The wiring 71 acts as a means for intercoupling the stimuli and the stimuli actuating means. The circuit of FIG. 10 enables the production of a large number of responses or combination of responses from a small number of inexpensive electrical components, such as electrical switches and bulbs. In the circuit arrangement shown, a terminal point of slide switch 74 is electrically connected to a pole of series connected batteries 49. A first contact point of the switch 74 is connected to first terminals of electric bulbs 93, 95, 97 and 99. Second terminals of bulbs 93, 95, 97 and 99 are connected to contact points of switches 21, 22, 23 and 24, respectively. A second contact point of slide switch 74 is connected to first terminal points of electric bulbs 92, 94, 96 and 98. Second terminal points of bulbs 92, 94, 96 and 98 are connected to the first contact points of switches 21, 22, 23 and 24, respectively. A terminal point of switch 21 is connected to a pole of series connected batteries 49 and a second contact point thereof is connected to a terminal point of switch 22. A terminal point of switch 23 is connected to a second pole of batteries 49. A second contact point of switch 23 is connected to a terminal point of switch 24.

The arrangement of FIG. 10 provides a plural stage circuit arrangement. A first stage comprises the elements included in bracket a and a second stage comprises the elements included in bracket B. Stages A and B are electrically connected in a parallel circuit to either a first or second contact point of the switch 74. It should be understood that additional stages may be employed.

Each stage comprises a contact switch 74 for connecting a first group a' comprising in series either a first electrical device 92 and a contact switch 21 or a second electrical device 93 and a contact switch 21. Action of switch 74 similarly connect elements of group b'. Groups a' and b' are arranged so that only one of the groups may be activated at any specific time. Additional groups in each stage may be employed if desired.

It should be understood that a large variety of illuminated patterns may be produced by actuation of the various switches provided. For example, when the switch 74 is in the position shown in FIG. 10, bulb 93 may be illuminated by actuation of switch 21. Bulb 93 may be turned off by deactivation of switch 21 or sliding deactivation of switch 74 to move the contact arm thereof to a center position between the two contact points or into contact with the second contact point whereupon bulb 92 will be illuminated. When switch 21 is depressed, depression of switch 22 will not produce illumination. However, when switch 21 is in the position shown in FIG. 10, bulbs 94 or 95 may be illuminated depending upon the location of the contact blade of switch 74. The illumination of the light bulbs may be seen through the translucent support panel 70 and the corresponding cut out portion aligned with the light bulb illuminated.

In alternative embodiments of the invention, various electrical devices may be employed in place of the light bulbs described above. For example, electric buzzers, bells, vibrating elements, indicators, etc., may be connected to the circuit in place of the light bulbs described.

Although other circuits and varying numbers of components such as switches and electrical devices may be employed in the present invention, the disclosed arrangement is preferred.

While only a specific preferred embodiment of this invention has been described and illustrated, many variations and modifications of the invention are possible. All such variations and modifications are intended to be covered by the present invention which is to be limited only by the scope of the following claims interpreted in the light of the prior art.

What is claimed is:

1. In an educational and amusement apparatus an electrical circuit arrangement having a control means and an electrical energy source and comprising a plurality of stages connected in parallel,
   each stage comprising at least two groups,
   each group comprising first and second electrical devices and a single pole, double throw contact switch,
   said control means connecting in series said energy source with said first electrical device and said contact switch of each group and alternatively connecting in series said energy source with said second electrical device and said contact switch of each group,
   said contact switch of each group being arranged in series with a contact switch of another group in its stage and comprising means for restricting only one group in each stage to be activated at any specific time.

2. In an educational and amusement apparatus having a hollow housing with an enclosing wall means comprising opaque portions and substantially transparent portions, an electrical circuit arrangement having an electrical energy source, a control means and comprising a plurality of stages connected in parallel,
   each stage comprising at least two groups,
   each group being connected to said control means and having first and second electrical devices and a single pole, double throw contact switch,
   said control means comprising a means for connecting in series said first electrical device and said contact switch of each group with said energy source and for eliminating from said series said first electrical device of each group and substituting therefore said second electrical device of each group,
   said contact switch of each group being arranged in series with contact switches of other groups in each stage,
   and comprising means for intercoupling selected ones of said electrical devices with said energy source to activate at least one of said devices upon activating one selected contact switch and said one device may be deactivated by actuating said control means while activating said contact switch thereby actuating another of said electrical devices.

3. An apparatus in accordance with claim 2 wherein said electrical devices are light sources.

4. An apparatus in accordance with claim 1 wherein two stages are employed and said apparatus comprises a hollow housing with an enclosing wall means comprising opaque portions and substantially transparent portions.

5. In an educational and amusement apparatus an electrical circuit arrangement comprising a first control single pole, double throw contact switch having first and second contact points and a terminal point whereby said contact points can be selectively connected to said terminal point,
   said terminal point being electrically connected to an electrical energy source, a first and second plurality of electrical devices each having first and second terminals, said first contact point being electrically connected to said first terminals of each of said first plurality of electrical devices, a plurality of single pole double throw electrical switch contacts, said second terminals of each of said first plurality of devices being individually connected to first contact points of each of said plurality of electrical switch contacts, said second contact point being electrically connected to said first terminals of each of said second plurality of electrical devices, the second terminal of each of said second plurality of electrical devices being individually connected to said first contact points of said plurality of electrical switch contacts, a preselected number of said plurality of electrical switch contacts each having a terminal point connected to said electrical energy source, and said preselected switch contacts each having second contact points electrically connected to terminal points of others of said plurality of electrical switch contacts whereby selected ones of said electrical devices may be intercoupled with said energy source to activate at least one of said devices on activating one selected switch contact and said one device may be deactivated by actuating said control contact switch while activating said one switch contact thereby actuating another of said electrical devices.

References Cited by the Examiner
UNITED STATES PATENTS

| | | | |
|---|---|---|---|
| 1,911,971 | 5/1933 | Reidel | 307—10 |
| 2,492,571 | 12/1949 | Goldfarb. | |
| 2,664,665 | 1/1954 | Rozendoff | 46—228 X |
| 2,880,408 | 3/1959 | Sewell | 46—228 X |
| 2,970,386 | 2/1961 | Knutson | 35—9.1 |
| 3,007,150 | 10/1961 | Arrasmith. | |

EUGENE R. CAPOZIO, *Primary Examiner.*

RICHARD C. PINKHAM, JEROME SCHNALL,
*Examiners.*